(12) United States Patent
Shimizu et al.

(10) Patent No.: US 10,655,740 B2
(45) Date of Patent: May 19, 2020

(54) WORK MACHINE

(71) Applicant: Hitachi Construction Machinery Co., Ltd., Taito-ku, Tokyo (JP)

(72) Inventors: Juri Shimizu, Tokyo (JP); Teppei Saitoh, Tokyo (JP); Kenji Hiraku, Tsuchiura (JP); Yuki Akiyama, Tsuchiura (JP); Hiromasa Takahashi, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 59 days.

(21) Appl. No.: 15/577,847

(22) PCT Filed: Feb. 25, 2016

(86) PCT No.: PCT/JP2016/055723
§ 371 (c)(1),
(2) Date: Nov. 29, 2017

(87) PCT Pub. No.: WO2016/194417
PCT Pub. Date: Dec. 8, 2016

(65) Prior Publication Data
US 2018/0135764 A1    May 17, 2018

(30) Foreign Application Priority Data
Jun. 3, 2015   (JP) ................... 2015-112851

(51) Int. Cl.
*F16K 11/07*    (2006.01)
*F15B 11/08*    (2006.01)
*E02F 9/22*    (2006.01)
*F16H 61/4104*    (2010.01)

(52) U.S. Cl.
CPC ............ *F16K 11/07* (2013.01); *E02F 9/2289* (2013.01); *F15B 11/08* (2013.01); *F16H 61/4104* (2013.01)

(58) Field of Classification Search
CPC ........................... E02F 9/2289; F16H 61/4104
See application file for complete search history.

(56) References Cited

U.S. PATENT DOCUMENTS 4,520,626 A * 6/1985 Nakajima ................ F15B 7/10
60/468
8,857,168 B2 * 10/2014 Opdenbosch ......... E02F 9/2217
60/414

(Continued)

FOREIGN PATENT DOCUMENTS

EP    0 056 230 A1    7/1982
JP    59208205 A * 11/1984

(Continued)

OTHER PUBLICATIONS

International Search Report (PCT/ISA/210) issued in PCT Application No. PCT/JP2016/055723 dated May 24, 2016 with English translation (3 pages).

(Continued)

*Primary Examiner* — Angelisa L. Hicks
(74) *Attorney, Agent, or Firm* — Crowell & Moring LLP

(57) ABSTRACT

A work machine includes a closed circuit system in which there is provided a flushing valve. The flushing valve is equipped with: a valve main body; a spool which can select, in accordance with a position where the spool is arranged in the valve main body, connection between a first flow line and a third flow line, connection between a second flow line and the third flow line, or interruption of the connection between the first flow line, the second flow line, and the third flow line; a first liquid chamber that is provided inside the valve main body and into which a hydraulic working fluid from the first flow line flows; a first piston pressurizing the hydraulic working fluid having flowed into the first liquid chamber and moving the spool to a position where the second flow line and the third flow line are connected (Continued)

together, by the hydraulic pressure of the first liquid chamber; a second liquid chamber that is provided inside the valve main body and into which the hydraulic working fluid from the second flow line flows; and a second piston pressurizing the hydraulic working fluid having flowed into the second liquid chamber and moving the spool to a position where the first flow line and the third flow line are connected together, by the hydraulic pressure of the second liquid chamber.

5 Claims, 7 Drawing Sheets

(56) References Cited

U.S. PATENT DOCUMENTS

2004/0211175 A1   10/2004  Widemann
2005/0005600 A1    1/2005  Gandrud

FOREIGN PATENT DOCUMENTS

JP              62-170402 U      10/1987
WO     WO-2014176252 A1 *  10/2014  .............. F15B 7/006

OTHER PUBLICATIONS

Japanese-language Written Opinion (PCT/ISA/237) issued in PCT Application No. PCT/JP2016/055723 dated May 24, 2016 (4 pages).
International Preliminary Report on Patentability (PCT/IB/338 & PCT/IB/373) issued in PCT Application No. PCT/JP2016/055723 dated Dec. 14, 2017, including English translation of document C2 (Japanese-language Written Opinion (PCT/ISA/227)) previously submitted on Nov. 29, 2017 (Eight (8) pages).
Extended European Search Report issued in counterpart European Application No. 16802856.1 dated Feb. 14, 2019 with English translation (eight (8) pages).

* cited by examiner

WORK MACHINE

TECHNICAL FIELD

The present invention relates to a work machine and, more specifically, to a work machine such as a hydraulic excavator equipped with a hydraulic drive control system.

BACKGROUND ART

In recent years, for a work machine such as a hydraulic excavator to reduce the throttle components in a hydraulic circuit driving a hydraulic actuator such as a hydraulic cylinder to thereby achieve a reduction in fuel consumption, there is being developed a hydraulic circuit (hereinafter referred to as the closed circuit) in which connection is effected such that the hydraulic working fluid is sent to a hydraulic actuator from a hydraulic drive source such as a hydraulic pump and that the hydraulic working fluid having performed work at the hydraulic actuator is returned to the hydraulic pump instead of returning it to the tank.

JP-1984-208205-A (Patent Document 1) discloses a background-art technique of the present technical field. The above-mentioned publication discloses a flushing valve discharging surplus fluid flow inside a hydraulic closed circuit, in which there are provided a first pressure receiving section connected to the rod side flow line of a single rod cylinder for generating the force for driving a spool selecting the destination of connection and a second pressure receiving section connected to the head side flow line, with the pressure receiving area of the second pressure receiving section being set to be larger than the area of the first pressure receiving section.

Due to the provision of such a flushing valve, even when the pressure balance within the single rod cylinder instantaneously fluctuates, the switching of the flushing valve is stabilized, making it possible to smoothly drive the single rod cylinder.

PRIOR ART DOCUMENT

Patent Document

Patent Document 1: JP-1984-208205-A

SUMMARY OF THE INVENTION

Problem to be Solved by the Invention

Generally speaking, in a flushing valve, in order to enhance the responsiveness of the hydraulic closed circuit, the connection of all the ports is interrupted when the load direction of the actuator is reversed, especially when a non-load state is attained. When the single rod cylinder is in the non-load state, the area of the head chamber pressure receiving section is larger than the area of the rod chamber pressure receiving section, so that the rod chamber pressure is higher than the head chamber pressure.

Patent Document 1 discloses a flushing valve formed such that the area ratio of the first pressure receiving section to the second pressure receiving section of the flushing valve is the same as the area ratio of the head chamber pressure receiving section to the rod chamber pressure receiving section of the single rod cylinder. In this case, in the condition in which the rod chamber pressure and the head chamber pressure of the single rod cylinder are balanced with each other, the force applied to the spool of the flushing valve from the first pressure receiving section and the force applied thereto from the second pressure receiving section are balanced with each other. Further, at this time, there is provided a spring for maintaining the spool is provided at the position where the connection of all the ports is interrupted.

In the case where there is an error between the area ratio of the first pressure receiving section to the second pressure receiving section of the flushing valve and the area ratio of head chamber pressure receiving section to the rod chamber pressure receiving section of the single rod cylinder, there is generated, in the state in which the single rod cylinder is in the non-load condition, a force driving the spool of the flushing valve. At this time, to maintain the spool at the position where the connection of all the ports of the flushing valve is interrupted, it is necessary to suppress the force generated due to the error in the area ratio by a pre-load which is imparted when the spring is set.

The hydraulic excavator, which is a work machine, carries a plurality of kinds of single rod cylinders differing in the pressure receiving area ratio of the rod chamber to the head chamber. Thus, when the flushing valve as disclosed in Patent Document 1 is applied to a hydraulic excavator, it is necessary to prepare a flushing valve for each of the plurality of kinds of single rod cylinders, so that sharing of components is impossible, resulting in an increase in cost.

Further, to increase the flow rate of the hydraulic fluid passing through the flushing valve, it is necessary to increase the diameter of the spool, which involves an increase in the area of the first pressure receiving section and the second pressure receiving section. When the areas of the first pressure receiving section and the second pressure receiving section increases, the force generated due to an error in the area ratio when the single rod cylinder is in the non-load condition also increases, so that it is necessary to increase the pre-load of the above-mentioned spring.

To enhance the responsiveness of the flushing valve, it is necessary for the spring constant of the spring of the flushing valve to be low. Thus, to increase the pre-load while maintaining a predetermined spring constant, an increase in the size of the spring is needed, resulting in a problem in which the size of the flushing valve increases as a whole.

The present invention has been made in view of the above circumstances. It is an object of the present invention to provide a work machine including a closed circuit system driving a hydraulic actuator by a hydraulic pump, in which there is provided a flushing valve which realizes a satisfactory operability even when a load on a single rod cylinder is reversed, which is small in size, and which can cope with a high flow rate.

Means for Solving the Problem

To achieve the above object, the present invention adopts, for example, the construction as claimed in the appended claims. The present application includes a plurality of means for solving the above problem, an example of which is a work machine including: one hydraulic pump having flow rate regulation means controlling the flow rate and direction of a hydraulic working fluid delivered; a single rod hydraulic cylinder driven by the hydraulic working fluid and configured to drive a work device; a hydraulic closed circuit connecting in a closed-circuit-like fashion the one hydraulic pump and the single rod hydraulic cylinder by a flow line through which the hydraulic working fluid flows; other hydraulic pump delivering the hydraulic working fluid; a relief valve connected to a delivery flow line of the other hydraulic pump; a first flow line connected to a head side hydraulic fluid chamber of the single rod hydraulic cylinder of the hydraulic closed circuit; a first check valve connected so as to be capable of supplying the hydraulic working fluid to the first flow line from the delivery flow line of the other hydraulic pump; a second flow line connected to a rod side hydraulic fluid chamber of the single rod hydraulic cylinder of the hydraulic closed circuit; a second check valve connected so as to be capable of supplying the hydraulic working fluid to the second flow line from the delivery flow line of the other hydraulic pump; a third flow line connected to a tank via the relief valve; and a flushing valve. Further, in the work machine, the flushing valve is equipped with a valve main body connected to the first flow line, the second flow line, and the third flow line; a spool that can select, in accordance with a position where the spool is arranged in the valve main body, a connection between the first flow line and the third flow line, a connection between the second flow line and the third flow line, or an interruption of the connection between the first flow line, the second flow line, and the third flow line; a first liquid chamber that is provided inside the valve main body and into which the hydraulic working fluid from the first flow line flows; a first piston pressurizing the hydraulic working fluid having flowed into the first liquid chamber and moving the spool to a position where the second flow line and the third flow line are connected together, by a hydraulic pressure of the first liquid chamber; a second liquid chamber that is provided inside the valve main body and into which the hydraulic working fluid from the second flow line flows; and a second piston pressurizing the hydraulic working fluid having flowed into the second liquid chamber and moving the spool to a position where the first flow line and the third flow line are connected together, by a hydraulic pressure of the second liquid chamber.

Advantage of the Invention

According to the present invention, there are provided a spool controlling the connecting condition of a flushing valve and flow rate therethrough, and two pistons pressurizing the spool, so that it is possible to provide a work machine equipped with a flushing valve of a small size and capable of coping with a high flow rate.

MODES FOR CARRYING OUT THE INVENTION

In the following, embodiments of the work machine of the present invention will be described with reference to the drawings.

Embodiment 1

Figure 1:
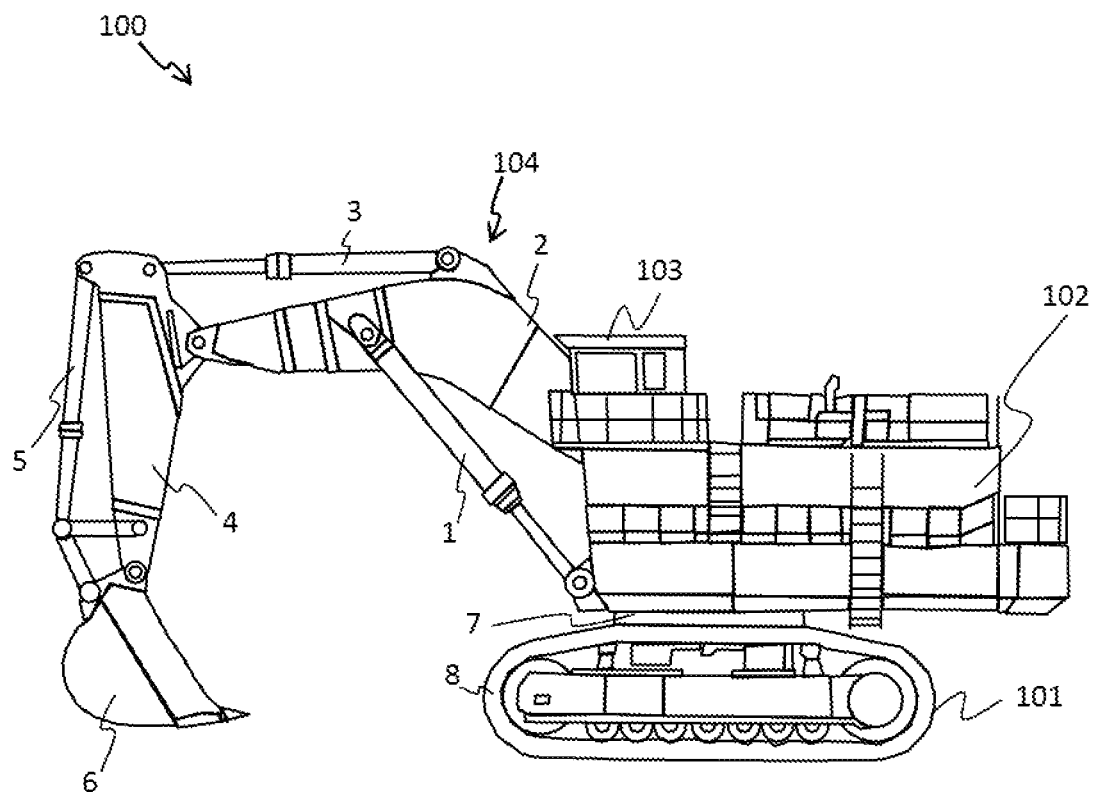
FIG. 1 is a side view of a hydraulic excavator that is a first embodiment of a work machine according to the present invention.
Figure 2:
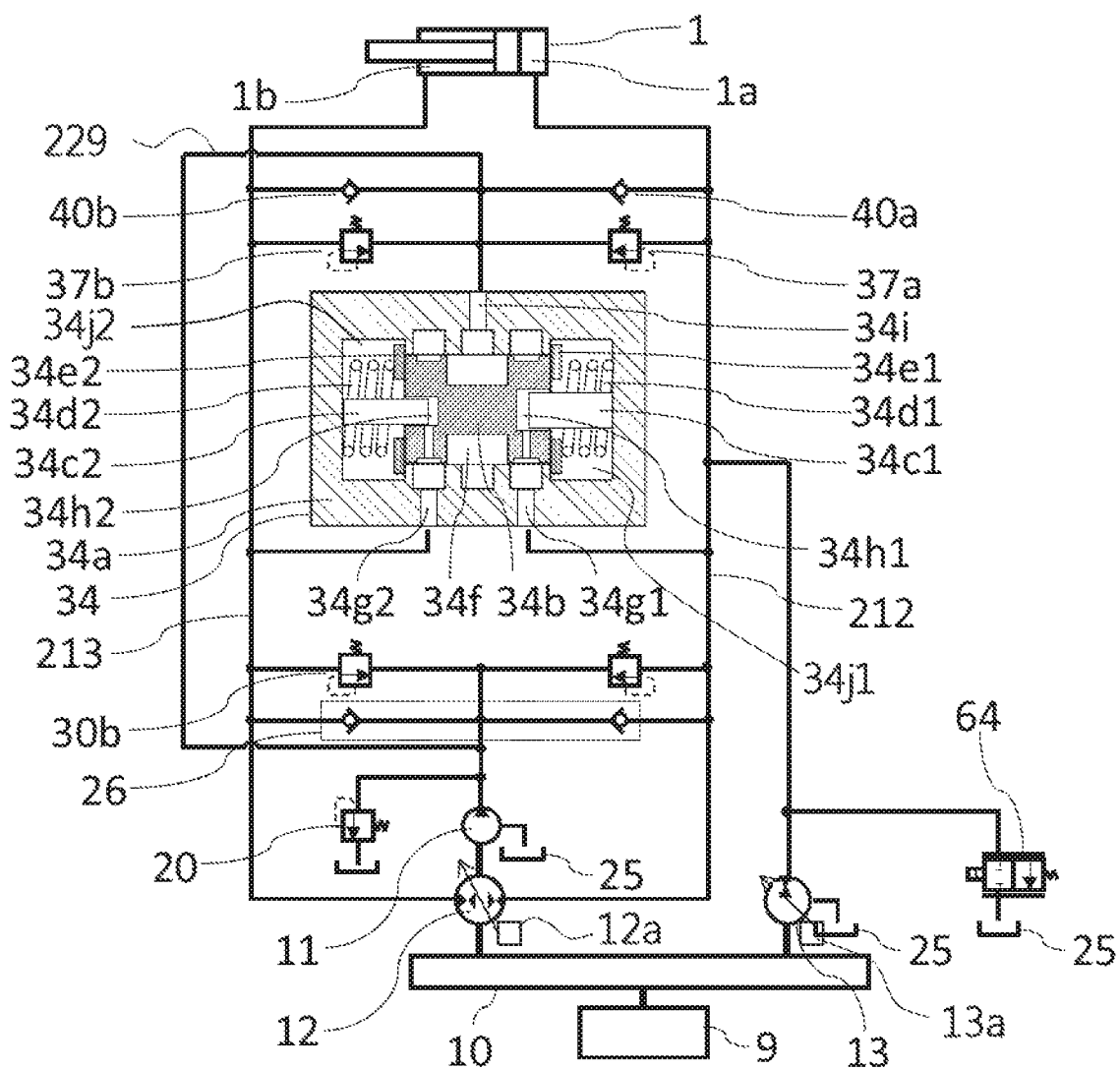
FIG. 2 is a hydraulic circuit diagram including a flushing valve constituting the first embodiment of the work machine according to the present invention.

FIG. 1 is a side view of a hydraulic excavator that is a first embodiment of a work machine according to the present invention, and FIG. 2 is a hydraulic circuit diagram including a flushing valve constituting the first embodiment of the work machine according to the present invention.

According to the present embodiment, inside a hydraulic drive control system of a hydraulic excavator 100, a first pump is connected in a closed-circuit-like fashion with respect to each hydraulic single rod cylinder, and a second pump is connected in an open-circuit-like fashion such that the second pump has on the delivery side thereof a flow line of the closed circuit and has on the suction side thereof a tank. A hydraulic single rod cylinder is dedicated to the first pump of the closed circuit and the second pump of the open circuit, whereby it is possible to properly control the flow rate of the hydraulic fluid flowing into the hydraulic single rod cylinder without being affected by the fluctuation in pressure of the other actuators. As a result, it is possible to obtain a work machine which secures a satisfactory operability.

In FIG. 1, the hydraulic excavator 100 is equipped with a lower track structure 101 equipped with a crawler type track device 8 and an upper swing structure 102 swingably provided on the lower track structure 101 through the intermediation of a swing device 7. Arranged on the upper swing structure 102 is a cab 103 boarded by the operator. Further, a proximal end section of a front work device 104 is rotatably mounted to the front side of the upper swing structure 102.

The front work device 104 is a multi-joint structure having a boom 2, an arm 4, and a bucket 6. The boom 2 rotates in the vertical direction with respect to the upper swing structure 102 through expansion/contraction of a boom cylinder 1 consisting of a hydraulic single rod cylinder. The arm 4 rotates in the vertical direction and the front-rear direction with respect to the boom 2 through expansion/contract ion of an arm cylinder 3 consisting of a hydraulic single rod cylinder. The bucket 6 rotates in the vertical direction and the front-rear direction with respect to the arm 4 through expansion/contraction of a bucket cylinder 5 consisting of a hydraulic single rod cylinder.

In the present embodiment, there are provided one closed circuit pump and one open circuit pump with respect to one hydraulic single rod cylinder. When driving the hydraulic single rod cylinder, flow rate control is performed through a combination of the closed circuit pump, the open circuit pump, and a proportional valve.

Next, the system configuration of the hydraulic drive control system of the hydraulic circuit shown in FIG. 2 will be described.

In FIG. 2, the drive shaft of an engine 9 constituting the power source is connected to a power transmission device 10 distributing the power. Connected to the power transmission device 10 are a first hydraulic pump 12 constituting one hydraulic pump, a second hydraulic pump 13, and a charge pump 11 constituting another hydraulic pump.

The first hydraulic pump 12 and the second hydraulic pump 13 are each equipped with a both-way tilting swash plate mechanism having a pair of input/output ports constituting flow rate regulation means, and a regulator adjusting the tilting angle of the both-way tilting swash plate. Through the adjustment of the tilting angle of the both-way tilting swash plate, the first hydraulic pump 12 and the second hydraulic pump 13 can control the delivery flow rate and direction of the hydraulic working fluid from the input/output ports. Further, when supplied with the hydraulic fluid, they also function as hydraulic motors. The charge pump 11 supplies the hydraulic fluid to the hydraulic circuit from a tank 25.

Connected to the pair of input/output ports of the first hydraulic pump 12 are a flow line 212 constituting the first flow line and a flow line 213 constituting the second flow line. The first hydraulic pump 12 is connected to the boom cylinder 1 via the flow lines 212 and 213, thereby forming the closed circuit.

One side of the pair of input/output ports of the second hydraulic pump 13 is connected to the flow line 212. The other side of the pair of input/output ports of the second hydraulic pump 13 is connected to a flow line communicating with the tank 25.

A flow line 229 which is a third flow line connected to the delivery port of the charge pump 11 is provided with a charging relief valve 20 and charging check valves 26, 40a, and 40b. The suction port of the charge pump 11 is connected to the flow line communicating with the tank 25.

The charging relief valve 20 adjusts the charge pressure of the charging check valves 26, 40a, and 40b. When the pressure of the flow lines 212 and 213 is below the pressure set by the charging relief valve 20, the charging check valve 26 supplies the hydraulic fluid of the charge pump 11 to the flow lines 212 and 213. When the pressure of the flow lines 212 and 213 is below the pressure set by the charging relief valve 20, the charging check valves 40a and 40b supply the hydraulic fluid of the charge pump 11 to the flow lines 212 and 213.

When the flow line pressure is equal to or larger than a predetermined pressure, relief valves 30a and 30b provided in the flow line 212 and the flow line 213 cause the hydraulic working fluid to escape to the tank 25 via the charging relief valve 20 to thereby protect the hydraulic circuit. Further, when the flow line pressure is equal to or larger than a predetermined pressure, relief valves 37a and 37b provided in the flow lines 212 and 213 cause the hydraulic working fluid to escape to the tank 25 via the charging relief valve 20 to thereby protect the hydraulic circuit.

The flow line 212, which is the first flow line, is connected to a head side hydraulic fluid chamber 1a of a boom cylinder 1. The flow line 213, which is the second flow line, is connected to a rod side hydraulic fluid chamber 1b of the boom cylinder 1. The boom cylinder 1 is a hydraulic single rod cylinder configured to expand and contract upon receiving the supply of the hydraulic working fluid. The expanding/contracting direction of the boom cylinder 1 depends upon the supply direction of the hydraulic working fluid. Further, a flushing valve 34 provided between the flow lines 212 and 213 discharges surplus hydraulic fluid in the flow lines to the tank 25 via the charging relief valve 20.

Next, the structure of the flushing valve 34 will be described.

The flushing valve 34 is equipped with a first port 34g1 to which the hydraulic fluid from the flow line 212 which is the first flow line is supplied, a second port 34g2 to which the hydraulic fluid from the flow line 213 which is the second flow line is supplied, a third port 34i connected to a flow line 229 which is the third flow line communicating with the tank 25, and a valve main body 34a having these ports.

Further, a spool hole 34f is formed in the valve main body 34a, and a spool 34b is inserted into this spool hole 34f. Around the spool hole 34f, there is formed the third port 34i connected to the flow line 229. With this being in the middle, there is formed on the right side in the figure the first port 34g1 connected to the flow line 212, and there is formed on the left-hand side in the figure the second port 34g2 connected to the flow line 213. On both sides of the spool hole 34f, there are provided a first spring chamber 34j1 and a second spring chamber 34j2 of a larger diameter than the spool hole 34f. Arranged inside the first and second spring chambers 34j1 and 34j2 are a first spring 34d1 and a second spring 34d2 pressurizing the spool 34b, a first spring seat 34e1, a second spring seat 34e2, a first piston 34c1, and a second piston 34c2.

The portions of the spool 34b corresponding to the left and right first and second ports 34g1 and 34g2 are large diameter portions, and the portion thereof corresponding to the third port 34i is a small diameter portion. The right end surface of the spool 34b has a first recess section 34rs1 (FIG. 4B) with which the first piston 34c1 is slidably fit-engaged, and the left end surface of the spool 34b has a second recess section 34rs2 (FIG. 4A) with which the second piston 34c2 is slidably fit-engaged. Between the first piston 34c1 and the first recess section, there is formed a first hydraulic fluid chamber 34h1, and, between the second piston 34c2 and the second recess section, there is formed a second hydraulic fluid chamber 34h2. The first hydraulic fluid chamber 34h1 communicates with the first port 34g1, and the hydraulic fluid from the flow line 212 flows into it. The second hydraulic fluid chamber 34h2 communicates with the second port 34g2, and the hydraulic fluid from the flow line 213 flows into it.

As shown in FIG. 2, the first spring 34d1, the second spring 34d2, the first spring seat 34e1, and the second spring seat 34e2 of the flushing valve 34b press the spool 34b from the left and right, and have the function by which they maintain a neutral position in which the first port 34g1, the second port 34g2, and the third port 34i are closed from each other.

The first piston 34c1 of the flushing valve 34b presses the spool 34b by the hydraulic pressure of the first hydraulic fluid chamber 34h1 communicating with the first port 34g1, such that the second port 34g2 and the third port 34i communicate with each other. Similarly, the second piston 34c2 presses the spool 34b by the hydraulic pressure of the second hydraulic fluid chamber 34h2 communicating with the second port 34g2, such that the first port 34g1 and the third port 34i communicate with each other.

The flushing valve 34 needs to be endowed with a low pressure selection valve function by which, of the first port 34g1 and the second port 34g2, the one of lower pressure is connected to the third port 34i. Here, the ideal characteristics of the flushing valve in the hydraulic system in which there are provided one closed circuit pump and one open circuit pump with respect to the one hydraulic single rod cylinder shown in FIG. 2 and in which, when driving the hydraulic single rod cylinder, flow rate control is performed through a combination of the closed circuit pump, the open circuit pump, and the proportional valve, will be described with reference to FIG. 3A.

Figure 3A:
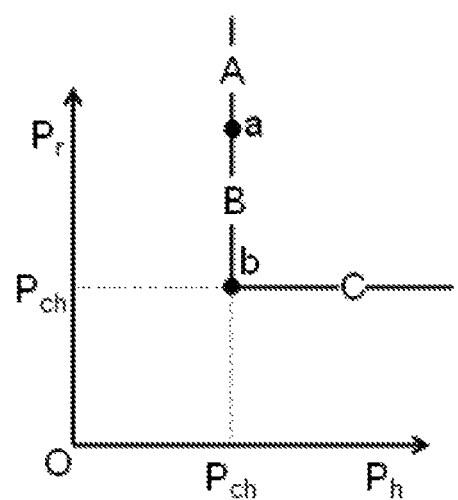
FIG. 3A is a characteristics chart illustrating the ideal characteristics of the flushing valve constituting the work machine according to the first embodiment of the present invention.

FIG. 3A is a characteristics chart illustrating the ideal characteristics of the flushing valve constituting the first embodiment of the work machine according to the present invention. In FIG. 3A, the horizontal axis indicates a head pressure Ph which is the pressure of the head side hydraulic fluid chamber 1a of the boom cylinder 1, and the vertical axis indicates a rod pressure Pr which is the pressure of the rod side hydraulic fluid chamber 1b, showing the connecting condition of the first port 34g1, the second port 34g2, and the third port 34i of the flushing valve 34 in combinations of the pressures.

As shown in FIG. 3A, in the hydraulic circuit shown in FIG. 2, the lower pressure of the head pressure Ph and the rod pressure Pr is equal to a charge pressure Pch adjusted by the charging relief valve 20, so that, ideally, it is only necessary to examine solely the pressure combination conditions in the line indicated by the regions A, B, and C. In FIG. 3A, suppose the point at which both the pressure Ph of the head side hydraulic fluid chamber 1a and the pressure Pr of the rod side hydraulic fluid chamber 1b of the boom cylinder 1 are equal to the charge pressure Pch is a point b. Further, suppose a point at which the boom cylinder 1 is in equilibrium is a point a. The range where the rod pressure Pr is higher than the point a will be referred to as region A, and the range between points a and b will be referred to as region B. Further, the range where the head pressure Ph is higher than the point b will be referred to as region C. At the point a, since the external force exerted on the boom cylinder 1 is 0, so that the force Fr exerted from the rod side hydraulic fluid chamber 1b and the force Fh exerted from the head side hydraulic fluid chamber 1a are in equilibrium with each other. At this time, from the relationship between the pressure receiving area Ar of the rod side hydraulic fluid chamber 1b and the pressure receiving area Ah of the head side hydraulic fluid chamber 1a of the boom cylinder 1, the relationship between the rod pressure Pr and the head pressure Ph can be calculated by the following equations (1) through (3).

$$Fr = Ph \quad (1)$$

$$Pr \times Ar = Ph \times Ah \quad (2)$$

$$Pr = Ah/Ar \times Ph \quad (3)$$

The pressure receiving area Ah of the head side hydraulic fluid chamber 1a is larger than the pressure receiving area Ar of the rod side hydraulic fluid chamber 1b, so that it can be seen from the above relationship that in the case where the boom cylinder 1 is in equilibrium, the rod pressure Pr is higher than the head pressure Ph. Further, the low pressure side is always the charge pressure Pch, so that the head pressure Ph and the rod pressure Pr at the point a can be calculated by the following equations (4) and (5).

$$Ph = Pch \quad (4)$$

$$Pr = Ah/Ar \times Pch \quad (5)$$

In region B shown in FIG. 3A, it is necessary to arrange the spool 34b at a neutral position and to place the first port 34g1, the second port 34g2, and the third port 34i in a state in which they are closed from each other.

In region B, the rod pressure Pr is higher than the head pressure Ph, so that when, in the hydraulic circuit shown in FIG. 2, the flushing valve 34 is endowed solely with the function of an ordinary low pressure selection valve, the first port 34g1 and the third port 34i communicate with each other. When, in this state, an attempt is made to expand the boom cylinder 1, the hydraulic fluid delivered from the closed circuit 12 and the open circuit pump 13 is allowed to flow from the charging relief valve 20 to the tank 25 via the flow line 212, the first port 34g1 and the third port 34i, so that the boom cylinder 1 ceases to drive. If, however, in region B, the state is maintained in which the first port 34g1, the second port 34g2, and the third port 34i of the flushing valve 34 are closed from each other, when it is desired that the boom cylinder 1 be expanded in the equilibrium state of the boom cylinder 1, the hydraulic fluid delivered from the closed circuit pump 12 and the open circuit pump 13 flows info the head side hydraulic fluid chamber 1a of the boom cylinder 1 via the flow line 212, this results in that the boom cylinder 1 is driven to be expanded.

In region A where the rod pressure Pr is higher than the point a of FIG. 3A, the rod pressure Pr is higher than the head pressure Ph, so that the flushing valve 34 needs to move the spool 34b to the right by the hydraulic pressure of the second liquid chamber 34h2 shown in FIG. 2, causing the first port 34g1 and the third port 34i to communicate with each other. Further, in region C where the head pressure Ph is higher than the point b, the head pressure Ph is higher than the rod pressure Pr, so that the flushing valve 34 needs to move the spool 34b to the left by the hydraulic pressure of the first liquid chamber 34h1 shown in FIG. 2, causing the second port 34g2 and the third port 34i to communicate with each other.

Figure 3B:
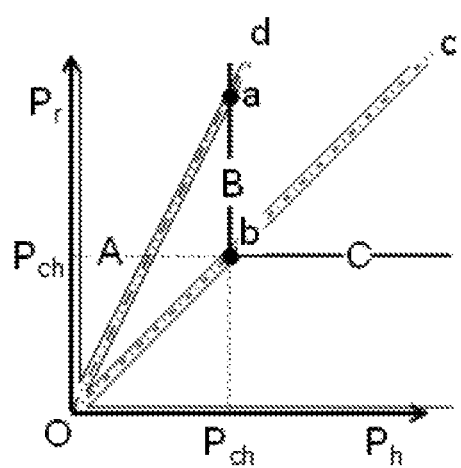
FIG. 3B is a characteristics chart illustrating the ideal region of the flushing valve constituting the first embodiment of the work machine according to the present invention.

In the actual flushing valve 34, due to a shortage of the flow rate of the charge pump 11 or a delay in response of the charging relief valve 20, the pressure on the low pressure side may fluctuate from the charge pressure Pch. Thus, regions A, B, and C need to be examined not only in the line but over the entire region shown in FIG. 3B. FIG. 3B is a characteristics chart illustrating the ideal region of the flushing valve constituting the first embodiment of the work machine according to the present invention.

Figure 3C:
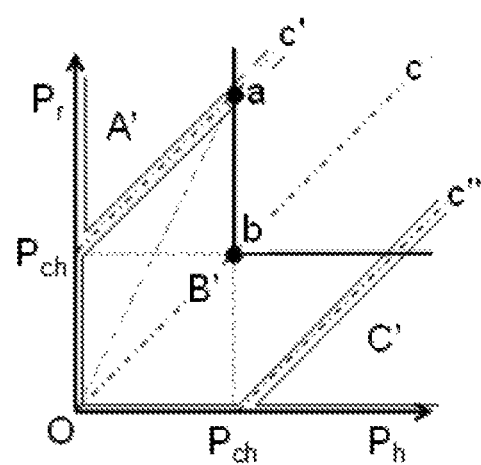
FIG. 3C is a characteristics chart illustrating an example of a set load of a spring of the flushing valve constituting the first embodiment of the work machine according to the present invention.
Figure 3D:
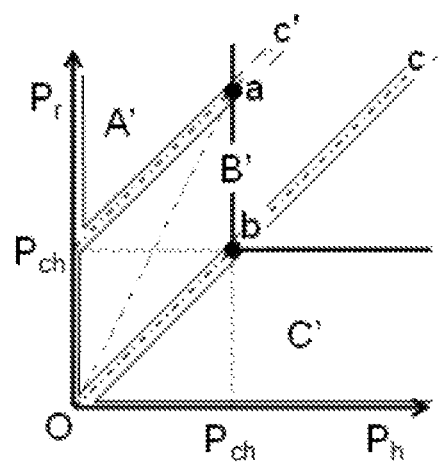
FIG. 3D is a characteristics chart illustrating another example of a set load of the flushing valve constituting the first embodiment of the work machine according to the present invention.

Next, a method of determining the ratio of the diameters of the first piston 34c1 to the second piston 34c2 and set load of the first spring 34d1 and of the second spring 34d2 for realizing the ideal regions A, B, and C shown in FIG. 3B will be described with reference to FIGS. 3C and 3D. FIG. 3C is a characteristics chart illustrating an example of a set load of a spring of the flushing valve constituting the first embodiment of the work machine according to the present invention, and FIG. 3D is a characteristics chart illustrating another example of a set load of the flushing valve constituting the first embodiment of the work machine according to the present invention.

First, the case where the pressure receiving area of the first piston 34c1 and that of the second piston 34c2 are the same will be described. In the case where the set load of the first spring 34$d$1 and the second spring 34$d$2 is 0, the boundary characteristics line determining whether, in the flushing valve 34, the third port 34$i$ is connected to the first port 34$g$1 or to the second port 34$g$2 is indicated by a straight line c expressed as a dash-single-dot line passing the point b, as shown in FIG. 3C. Here, the set load Fpre of the first spring 34$d$1 and the second spring 34$d$2 is set to a value calculated by the following equation (6).

$$Fpre=(Ah/Ar-1)\times Pch\times Ap \qquad (6)$$

Ap is the sectional area of the first piston 34$c$1 and the second piston 34$c$2. In other words, this is the value of the set load Fpre of the spring, which is obtained as follows: first, 1 is subtracted from the value obtained by dividing the pressure receiving area Ah of the head side hydraulic fluid chamber 1$a$ of the single rod cylinder 1 by the pressure receiving area Ar of the rod side hydraulic fluid chamber 1$b$ of the single rod cylinder 1. Then, the value thus obtained is multiplied by the load (Pch×Ap) generated in the first piston 34$c$1 in the case where the relief set pressure Pch of the relief valve 20 acts on the first liquid chamber 34$h$1, thereby obtaining the set load Fpre.

By imparting the set load Fpre to the first spring 34$d$1 and the second spring 34$d$2, it is possible to form a region B' surrounded by a straight line c' and a straight line c''.

The characteristics of the straight line c' passing the point a are set by equation (7), and the characteristics of the straight line c'' are set by equation (8).

$$Pr=Ph+Fpre/Ap \qquad (7)$$

$$Pr=Ph-Fpre/Ap \qquad (8)$$

By thus determining the load Fpre, the straight line c' passes the point a, and the section between the points a and b can be made region B' where the first port 34$g$1, the second port 34$g$2, and the third port 34$i$ of the flushing valve 34 are closed from each other. Further, in region A' where the rod pressure Pr is higher than the straight line c', the flushing valve 34 moves the spool 34$b$ to the right side by the hydraulic pressure of the second liquid chamber 34$h$2 shown in FIG. 2 to cause the first port 34$g$1 and the third port 34$i$ to communicate with each other. Further, in region C' where the head pressure Ph is higher than the straight line c'', the flushing valve 34 moves the spool 34$b$ to the left side by the hydraulic pressure of the first liquid chamber 34$h$1 shown in FIG. 2 to cause the second port 34$g$2 and the third port 34$i$ to communicate with each other.

As shown in FIG. 3D, in the case where the set load of the first spring 34$d$1 and the second spring 34$d$2 can be set independently, the straight line c' can pass the point a if the set load Fpre is imparted solely to the first spring 34$d$1. As a result, the section between the points a and b can be made region B' where the first port 34$g$1, the second port 34$g$2, and the third port 34$i$ of the flushing valve 34 are closed from each other.

Figure 3E:
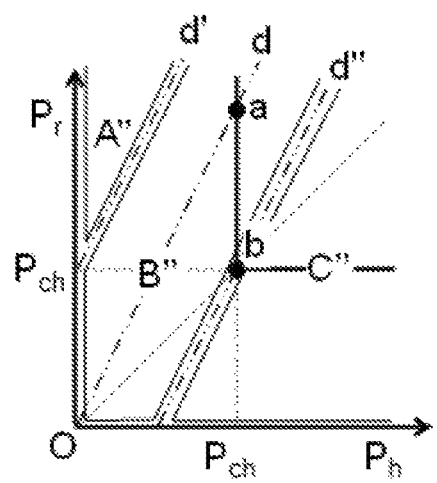
FIG. 3E is a characteristics chart illustrating an example of a set load of a spring of a flushing valve having a tandem piston constituting the first embodiment of the work machine according to the present invention.
Figure 3F:
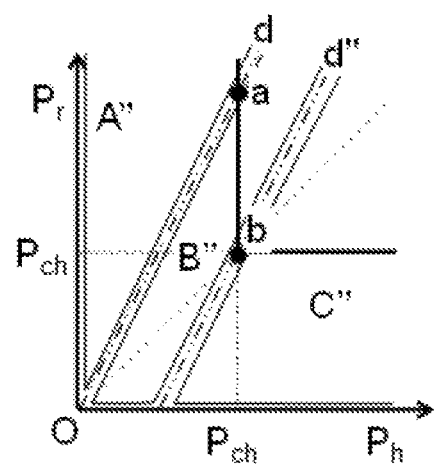
FIG. 3F is a characteristics chart illustrating an example of a set load of a spring of a flushing valve having a tandem piston constituting the first embodiment of the work machine according to the present invention.

Next, the case where the area ratio between the first piston 34$c$1 and the second piston 34$c$2 is equal to the area ratio between the pressure receiving area Ah of the head side hydraulic fluid chamber 1$a$ of the boom cylinder 1 and the pressure receiving area Ar of the rod side hydraulic fluid chamber 1$b$ thereof will be described with reference to FIGS. 3E and 3F. FIG. 3E is a characteristics chart illustrating an example of a set load of a spring of a flushing valve having a tandem piston constituting the first embodiment of the work machine according to the present invention, and FIG. 3F is a characteristics chart illustrating an example of a set load of a spring of a flushing valve having a tandem piston constituting the first embodiment of the work machine according to the present invention.

In the case where the set load of the first spring 34$d$1 and the second spring 34$d$2 is 0, as shown in FIG. 3E, the border characteristics line determining whether the third port 34$i$ of the flushing valve 34 is connected to the first port 34$g$1 or to the second port 34$g$2 is the straight line d indicated by the two-dot chain line passing the point a. The characteristics of the straight line d are set by equation (9).

$$Pr=Aph/Apr\times Ph \qquad (9)$$

Aph stands for the sectional area of the first piston 34$c$1, and Apr stands for the sectional area of the second piston 34$c$2. Here, the set load Fpre of the first spring 34$d$1 and the second spring 34$d$2 is set to the value calculated by the following equation (10).

$$Fpre=(Aph/Apr-1)\times Pch\times Apr$$

Therefore, $$Fpre=(Aph-Apr)\times Pch \qquad (10)$$

In other words, this is the value of the set load Fpre of the spring calculated by subtracting from the first load (Aph×Pch) generated in the first piston 34$c$1 in the case where the relief set pressure Pch of the relief valve 20 acts on the first liquid chamber 34$h$1 the second load (Apr×Pch) generated in the second piston 34$c$2 in the case where the relief set pressure Pch of the relief valve 20 acts on the second liquid chamber 34$h$2.

In this way, by imparting the set load Fpre to the first spring 34$d$1 and the second spring 34$d$2, it is possible to form region B'' surrounded by the straight line d' and the straight line d'' shown in FIG. 3E.

The characteristics of the straight line d' is set by equation (11), and the characteristics of the straight line d'' passing the point b is set by equation (12).

$$Pr=Aph/Apr\times Ph+Fpre/Apr \qquad (11)$$

$$Pr=Aph/Apr\times Ph-Fpre/Apr \qquad (12)$$

As shown in FIG. 3F, in the case where the set load of the first spring 34$d$1 and the second spring 34$d$2 can be set independently, the straight line d'' can pass the point b if the set load Fpre is imparted solely to the second spring 34$d$2. As a result, the section between the points a and b can be made region B'' where the first port 34$g$1, the second port 34$g$2, and the third port 34$i$ of the flushing valve 34 are closed from each other.

In the case where, as shown in FIG. 3C, the first piston 34$c$1 and the second piston 34$c$2 exhibit the same pressure receiving area, region B' is formed larger as compared with the case where, as shown in FIG. 3E, the area ratio between the first piston 34$c$1 and the second piston 34$c$2 is equal to the area ratio between the pressure receiving area Ah of the head side hydraulic fluid chamber 1$a$ of the boom cylinder 1 and the pressure receiving area Ar of the rod side hydraulic fluid chamber 1$b$ thereof. Region B' is a region where the first port 34$g$1, the second port 34$g$2, and the third port 34$i$ of the flushing valve 34 are cut off from each other, so that there is little risk of the port of higher pressure being connected to the third port 34$i$ when the high and low relationship between the head pressure Ph and the rod pressure Pr is reversed, and the operation is advantageously easier to stabilize.

Conversely, in the case where, as shown in FIG. 3E, the area ratio between the first piston 34$c$1 and the second piston 34$c$2 is equal to the area ratio between the pressure receiving area Ah of the head side hydraulic fluid chamber 1a of the boom cylinder 1 and the pressure receiving area Ar of the rod side hydraulic fluid chamber 1b thereof, region C" is formed larger as compared with the case where, as shown in FIG. 3C, the first piston 34c1 and the second piston 34c2 exhibit the same pressure receiving area. Region C" is a region where the spool 34b is moved to the left side by the hydraulic pressure of the first liquid chamber 34h1 shown in FIG. 2, causing the second port 34g2 and the third port 34i of the flushing valve 34 to communicate with each other.

In particular, since region C" is formed large, when the head pressure Ph becomes high at the time of cylinder expanding operation when the hydraulic excavator 100 performs work, the rod pressure Pr communicates with the third port 34i to thereby lower the rod pressure Pr. As a result, the head pressure Ph does not increase more than necessary, and the load applied to the closed circuit pump 12 and the open circuit pump 13 is suppressed, making it advantageously easy to achieve an improvement in terms of fuel efficiency.

Figure 4A:
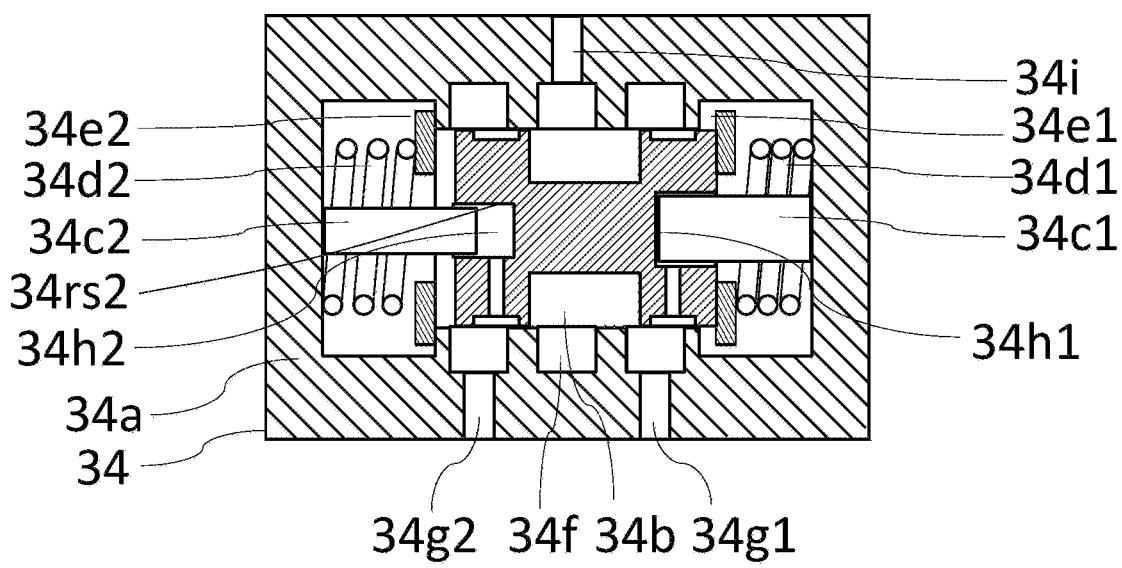
FIG. 4A is a sectional view illustrating an example of the operation of the flushing valve constituting the work machine according to the first embodiment of the present invention.
Figure 4B:
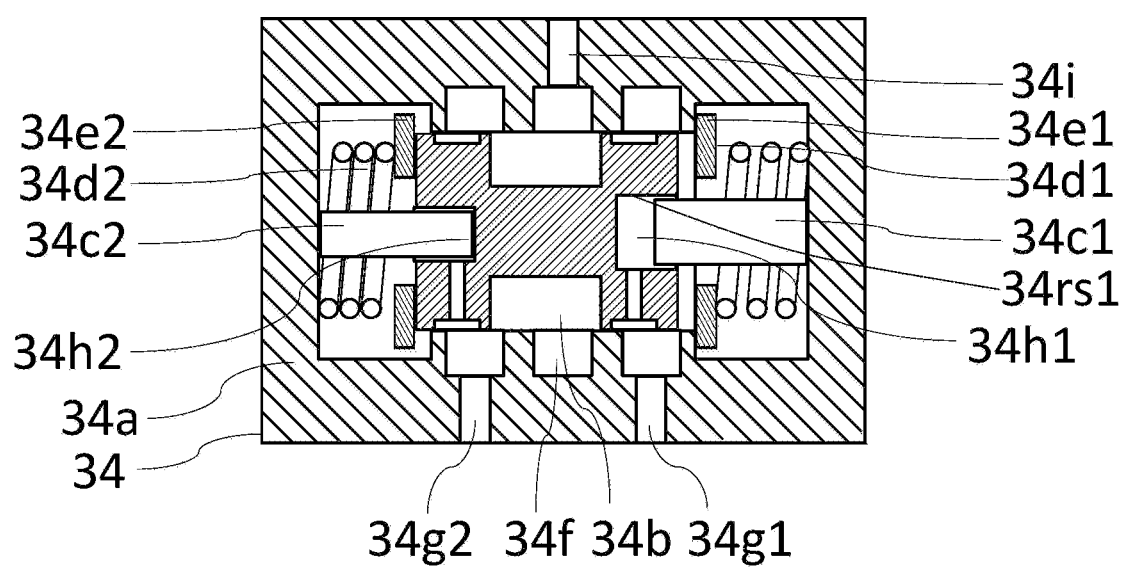
FIG. 4B is a sectional view illustrating another example of the operation of the flushing valve constituting the first embodiment of the work machine according to the present invention.

Next, the operation of the first embodiment of the work machine according to the present invention will be described with reference to FIG. 4A and FIG. 4B. FIG. 4A is a sectional view illustrating an example of the operation of the flushing valve constituting the first embodiment of the work machine according to the present invention, and FIG. 4B is a sectional view illustrating another example of the operation of the flushing valve constituting the first embodiment of the work machine according to the present invention. In FIG. 4A and FIG. 4B, the components that are the same as those of FIGS. 1 through 3F are indicated by the same reference characters, and a detailed description thereof will be left out.

In the hydraulic circuit shown in FIG. 2, the pressure Ph of the head side hydraulic fluid chamber 1a of the boom cylinder 1 is applied to the first hydraulic fluid chamber 34h1 via the flow line 212 and the first port 34g1 of the flushing valve 34. The pressure Ph exerted on the first hydraulic fluid chamber 34h1 acts on the pressure receiving area Aph of the first piston 34c1, whereby there is generated a force Fn pressing the spool 34b to the left side. Further, the pressure Pr of the rod side hydraulic fluid chamber 1b of the boom cylinder 1 is applied to the second hydraulic fluid chamber 34h2 via the flow line 213 and the second port 34g2 of the flushing valve 34. The pressure Pr exerted on the second hydraulic fluid chamber 34h2 acts on the pressure receiving area Apr of the second piston 34c2, whereby there is generated a force Fm pressing the spool 34b to the right side.

FIG. 4A shows a state in which, when the head pressure Ph which is the pressure of the head side hydraulic fluid chamber 1a of the boom cylinder 1 and the rod pressure Pr which is the pressure of the rod side hydraulic fluid chamber 1b thereof are compared with each other, the rod pressure Pr is sufficiently higher, and the spool 34b moves to the right direction, with the flushing valve 34 establishing communication between the flow line 212 and the charging relief valve 20. In the case where the rod pressure Pr is higher than the head pressure Ph, the relationship between a force Fn generated by a first piston 34c1 and a force Fm generated by a second piston 34c2 is as shown in equations (13) through (15).

$$Ph<<Pr \quad (13)$$

$$Ph \times Aph < Pr \times Apr \quad (14)$$

$$Fn<Fm \quad (15)$$

The force Fm generated by the second piston 34c2 is larger than the force Fn generated by the first piston 34c1, so that the spool 34b is pressed to the right side. As a result, as shown in FIG. 4A, the first port 34g1 and the third port 34i communicate with each other.

FIG. 4B shows a state in which, when the head pressure Ph which is the pressure of the head side hydraulic fluid chamber 1a of the boom cylinder 1 and the rod pressure Pr which is the pressure of the rod side hydraulic fluid chamber 1b thereof are compared with each other, the head pressure Ph is sufficiently higher, and the spool 34b moves to the left direction, with the flushing valve 34 establishing communication between the flow line 213 and the charging relief valve 20. In the case where the head pressure Ph is higher than the rod pressure Pr, the relationship between the force Fn generated by the first piston 34c1 and the force Fm generated by the second piston 34c2 is as shown in equations (16) through (18).

$$Ph>>Pr \quad (16)$$

$$Ph \times Aph > Pr \times Apr \quad (17)$$

$$Fn>Fm \quad (18)$$

The force Fn generated by the first piston 34c1 is larger than the force Fm generated by the second piston 34c2, so that the spool 34b is pressed to the left side. As a result, as shown in FIG. 4B, the second port 34g2 and the third port 34i communicate with each other.

The present embodiment adopts a structure in which the position of the spool 34b controlling the flow rate of the hydraulic fluid passing through the flushing valve 34 is controlled by the first piston 34c1 and the second piston 34c2 from both the left and right ends of the spool 34b. Thus, in the case where the flow rate of the fluid passing through the flushing valve 34 is to be made high, for example, it is only necessary to achieve an increase in the size of the spool 34b while maintaining the similarity thereof, and there is no need to change the first piston 34c1 and the second piston 34c2.

In particular, in the conventional structure, in the case where a pre-load is set, the pressure receiving section is increased in size with the increase in flow rate, so that it is necessary to increase the pre-load, and the first-spring 34d1 and the second spring 34d2 need to be increased in size. In the present embodiment, the first piston 34c1 and the second piston 34c2 are fixed independently of the flow rate, so that the pre-load may also be fixed. Thus, there is no need to increase the first spring 34d1 and the second spring 34d2 in size. As a result, it is possible to achieve a reduction in the size of the valve main body as compared with the flushing valve 34 of the conventional structure.

In the first embodiment of the work machine of the present invention described above, there are provided the spool 34b controlling the connecting condition of and the flow rate through the flushing valve 34, and the two pistons 34c1 and 34c2 pressing the spool 34b, so that it is possible to provide a work machine equipped with the flushing valve 34 small in size and capable of coping with high flow rate.

While in the present embodiment, two springs of the first spring 34d1 and the second spring 34d2 are provided, this should not be construed restrictively. It is also possible to adopt a structure using one spring or two or more springs. Further, insofar as the neutral position of the spring can be maintained, the set load may be of the value equal to or larger than that shown in equation (6).

Embodiment 2

Figure 5:
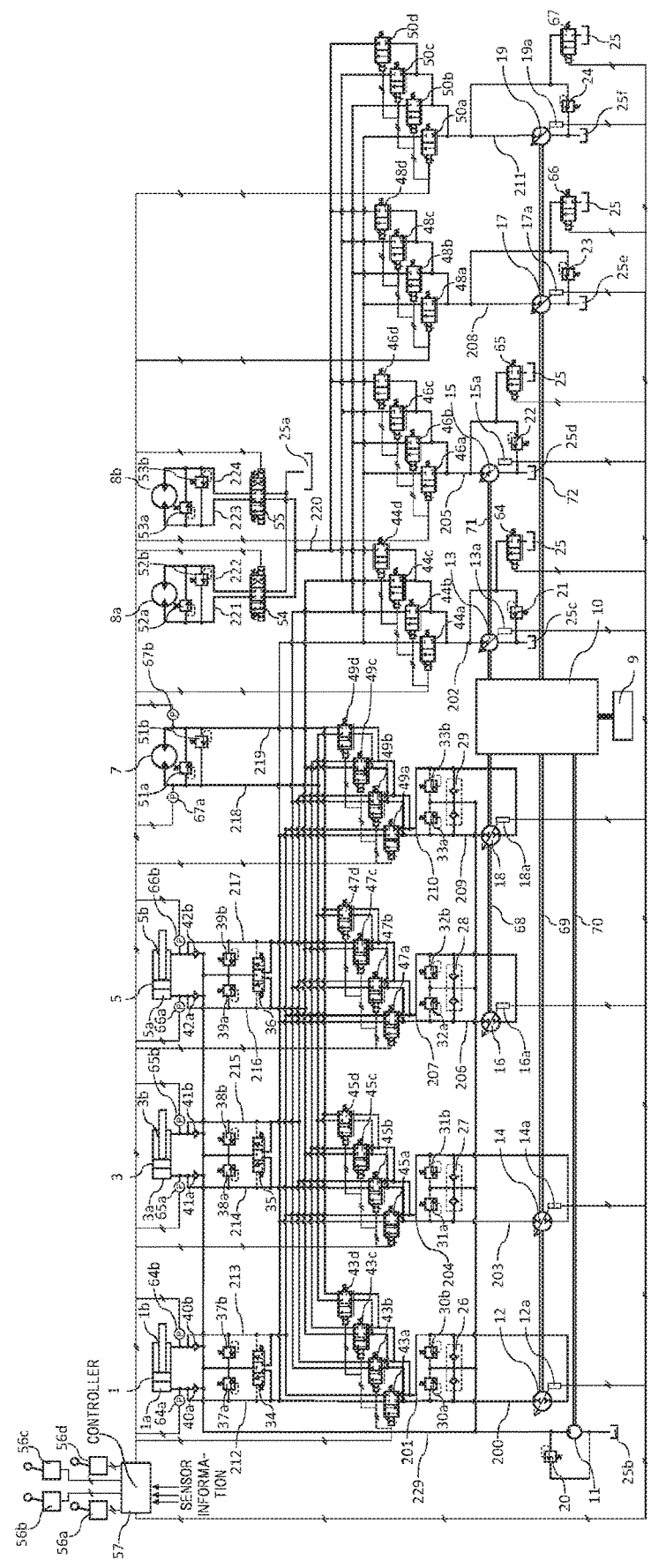
FIG. 5 is a hydraulic circuit diagram including a flushing valve constituting a second embodiment of the work machine according to the present invention.

In the following, the work machine according to the second embodiment of the present invention will be described with reference to the drawings. FIG. 5 is a hydraulic circuit diagram including a flushing valve constituting the second embodiment of the work machine according to the present invention. In FIG. 5, the components that are the same as those of FIGS. 1 through 4B are indicated by the same reference characters, and a detailed description thereof will be left out. In the present embodiment, there are provided four closed circuit pumps and four open circuit pumps with respect to three kinds of hydraulic single rod cylinders and three kinds of hydraulic motors, and when driving the hydraulic single rod cylinder, flow rate control is performed through a combination of one closed circuit pump and one open circuit pump. Further, each pump is provided with a selector valve, whereby a plurality of closed circuit pumps and a plurality of open circuit pumps can meet a single hydraulic single rod cylinder. There is provided a controller for controlling the selector valve so that when meeting a single hydraulic single rod cylinder, the meeting may be effected through a combination of one closed circuit pump and one open circuit pump.

The system configuration of the hydraulic drive control system in the hydraulic circuit shown in FIG. 5 will be described.

In FIG. 5, the drive shaft of the engine 9 constituting the power source is connected to the power transmission device 10 distributing power. Connected to the power transmission device 10 are a first hydraulic pump 12, a second hydraulic pump 13, a third hydraulic pump 14, a fourth hydraulic pump 15, a fifth hydraulic pump 16, a sixth hydraulic pump 17, a seventh hydraulic pump 18, an eighth hydraulic pump 19, and the charge pump 11.

The first hydraulic pump 12 and the third hydraulic pump 14 are connected to the power transmission device 10 via a drive shaft 69, and the fifth hydraulic pump 16 and the seventh hydraulic pump 18 are connected to the power transmission device 10 via a drive shaft 68.

Further, the second hydraulic pump 13 and the fourth hydraulic pump 15 are connected to the power transmission device via a drive shaft 71, the sixth hydraulic pump 17 and the eighth hydraulic pump 19 are connected to the power transmission device 10 via a drive shaft 72, and the charge pump 11 is connected to the power transmission device 10 via a drive shaft 70.

The first hydraulic pump 12, the second hydraulic pump 13, the third hydraulic pump 14, the fourth hydraulic pump 15, the fifth hydraulic pump 16, the sixth hydraulic pump 17, the seventh hydraulic pump 18, and the eighth hydraulic pump 19 are equipped with a both-way tilting swash plate mechanism having a pair of input/output ports, and regulators 12a, 13a, 14a, 15a, 16a, 17a, 18a, and 19a adjusting the tilting angle of both-way tilting swash plate.

The regulators 12a through 19a adjust the tilting angle of the both-way tilting swash plates of the first through eighth hydraulic pumps 12 through 19 by the signal from the controller 57. The first through eighth hydraulic pumps 12 through 19 can control the delivery flow rate and direction of the working fluid from the input/output ports through the adjustment of the tilting angle of each tooth-way swash plate.

The charge pump 11 supplies the flow line 229 with the hydraulic fluid. The first through eighth hydraulic pumps 12 through 19 are supplied with the hydraulic fluid, whereby they can also function as hydraulic motors.

Connected to the pair of input/output ports of the first hydraulic pump 12 are flow lines 200 and 201, and connected to the flow lines 200 and 201 are selector valves 43a, 43b, 43c, and 43d. The selector valves 43a, 43b, 43c, and 43d switch between conduction and interruption of the flow lines by a signal from a controller 57. When there is no signal from the controller 57, the selector valves 43a, 43b, 43c, and 43d are in the interruption state. Further, the controller 57 performs control such that the selector valves 43a, 43b, 43c, and 43d are not simultaneously placed in the conduction state.

The selector valve 43a is connected to the boom cylinder 1 via the flow lines 212 and 213. When the selector valve 43a is placed in the conduction state by the signal from the controller 57, the first hydraulic pump 12 is connected to the boom cylinder 1 via the flow lines 200 and 201, the selector valve 43a, and the flow lines 212 and 213, thereby forming a closed circuit. The selector valve 43b is connected to the arm cylinder 3 via the flow lines 214 and 215. When the selector valve 43b is placed in the conduction state by the signal from the controller 57, the first hydraulic pump 12 is connected to the arm cylinder 3 via the flow lines 200 and 201, the selector valve 43b, and the flow lines 214 and 215, thereby forming a closed circuit.

The selector valve 43c is connected to the bucket cylinder 5 via the flow lines 216 and 217. When the selector valve 43c is placed in the conduction state by the signal from the controller 57, the first hydraulic pump 12 is connected to the bucket cylinder 5 via the flow lines 200 and 201, the selector valve 43c, and the flow lines 216 and 217, thereby forming a closed circuit. The selector valve 43d is connected to the swing device 7 via flow lines 218 and 219. When the selector valve 43d is placed in the conduction state by the signal from the controller 57, the first hydraulic pump 12 is connected to the swing device 7 via the flow lines 200 and 201, the selector valve 43d, and the flow lines 218 and 219, thereby forming a closed circuit.

Connected to the pair of input/output ports of the third hydraulic pump 14 are flow lines 203 and 204, and connected to the flow lines 203 and 204 are selector valves 45a, 45b, 45c, and 45d. The selector valves 45a, 45b, 45c, and 45d switch between conduction and interruption of the flow lines by a signal front the controller 57. When there is no signal from the controller 57, the selector valves 45a, 45b, 45c, and 45d are in the interruption state. Further, the controller 57 performs control such that the selector valves 45a, 45b, 45c, and 45d are not simultaneously placed in the conduction state.

The selector valve 45a is connected to the boom cylinder 1 via the flow lines 212 and 213. When the selector valve 45a is placed in the conduction state by the signal from the controller 57, the third hydraulic pump 14 is connected to the boom cylinder 1 via the flow lines 203 and 204, the selector valve 45a, and the flow lines 212 and 213, thereby forming a closed circuit. The selector valve 45b is connected to the arm cylinder 3 via the flow lines 214 and 215. When the selector valve 45b is placed in the conduction state by the signal from the controller 57, the third hydraulic pump 14 is connected to the arm cylinder 3 via the flow lines 203 and 204, the selector valve 45b, and the flow lines 214 and 215, thereby forming a closed circuit.

The selector valve 45c is connected to the bucket cylinder 5 via the flow lines 216 and 217. When the selector valve 45c is placed in the conduction state by the signal from the controller 57, the third hydraulic pump 14 is connected to the bucket cylinder 5 via the flow lines 203 and 204, the selector valve 45c, and the flow lines 216 and 217, thereby forming a closed circuit. The selector valve 45*d* is connected to the swing device 7 via the flow lines 218 and 219. When the selector valve 45*d* is placed in the conduction state by the signal from the controller 57, the third hydraulic pump 14 is connected to the swing device 7 via the flow lines 203 and 204, the selector valve 45*d*, and the flow lines 218 and 219, thereby forming a closed circuit.

Connected to the pair of input/output ports of the fifth hydraulic pump 16 are flow lines 206 and 207, and connected to the flow lines 206 and 207 are selector valves 47*a*, 47*b*, 47*c*, and 47*d*. The selector valves 47*a*, 47*b*, 47*c*, and 47*d* switch between conduction and interruption of the flow lines by a signal from the controller 57. When there is no signal from the controller 57, the selector valves 47*a*, 47*b*, 47*c*, and 47*d* are in the interruption state. Further, the controller 57 performs control such that the selector valves 47*a*, 47*b*, 47*c*, and 47*d* are not simultaneously placed in the conduction state.

The selector valve 47*a* is connected to the boom cylinder 1 via the flow lines 212 and 213. When the selector valve 47*a* is placed in the conduction state by the signal from the controller 57, the fifth hydraulic pump 16 is connected to the boom cylinder 1 via the flow lines 206 and 207, the selector valve 47*a*, and the flow lines 212 and 213, thereby forming a closed circuit. The selector valve 47*b* is connected to the arm cylinder 3 via the flow lines 214 and 215. When the selector valve 47*b* is placed in the conduction state by the signal from the controller 57, the fifth hydraulic pump 16 is connected to the arm cylinder 3 via the flow lines 206 and 207, the selector valve 47*b*, and the flow lines 214 and 215, thereby forming a closed circuit.

The selector valve 47*c* is connected to the bucket cylinder 5 via the flow lines 216 and 217. When the selector valve 47*c* is placed in the conduction state by the signal from the controller 57, the fifth hydraulic pump 16 is connected to the bucket cylinder 5 via the flow lines 206 and 207, the selector valve 47*c*, and the flow lines 216 and 217, thereby forming a closed circuit. The selector valve 47*d* is connected to the swing device 7 via the flow lines 218 and 219. When the selector valve 47*a* is placed in the conduction state by the signal from the controller 57, the fifth hydraulic pump 16 is connected to the swing device 7 via the flow lines 206 and 207, the selector valve 47*d*, and the flow lines 218 and 219, thereby forming a closed circuit.

Connected to the pair of input/output ports of the seventh hydraulic pump 18 are flow lines 209 and 210, and connected to the flow lines 209 and 210 are selector valves 49*a*, 49*b*, 49*c*, and 49*d*. The selector valves 49*a*, 49*b*, 49*c*, and 49*d* switch between conduction and interruption of the flow lines by a signal from the controller 57. When there is no signal from the controller 57, the selector valves 49*a*, 49*b*, 49*c*, and 49*d* are in the interruption state. Further, the controller 57 performs control such that the selector valves 49*a*, 49*b*, 49*c*, and 49*d* are not simultaneously placed in the conduction state.

The selector valve 49*a* is connected to the boom cylinder 1 via the flow lines 212 and 213. When the selector valve 49*a* is placed in the conduction state by the signal from the controller 57, the seventh hydraulic pump 18 is connected to the boom cylinder 1 via the flow lines 209 and 210, the selector valve 49*a*, and the flow lines 212 and 213, thereby forming a closed circuit. The selector valve 49*b* is connected to the arm cylinder 3 via the flow lines 214 and 215. When the selector valve 49*b* is placed in the conduction state by the signal from the controller 57, the seventh hydraulic pump 18 is connected to the arm cylinder 3 via the flow lines 209 and 210, the selector valve 49*b*, and the flow lines 214 and 215, thereby forming a closed circuit.

The selector valve 49*c* is connected to the bucket cylinder 5 via the flow lines 216 and 217. When the selector valve 49*c* is placed in the conduction state by the signal from the controller 57, the seventh hydraulic pump 18 is connected to the bucket cylinder 5 via the flow lines 209 and 210, the selector valve 49*c*, and the flow lines 216 and 217, thereby forming a closed circuit. The selector valve 49*d* is connected to the swing device 7 via the flow lines 218 and 219. When the selector valve 49*d* is placed in the conduction state by the signal from the controller 57, the seventh hydraulic pump 18 is connected to the swing device 7 via the flow lines 209 and 210, the selector valve 49*d*, and the flow lines 218 and 219, thereby forming a closed circuit.

Connected to one side of the pair of input/output ports of the second hydraulic pump 13 is a flow line 202, and connected to the flow line 202 are selector valves 44*a*, 44*b*, 44*c*, and 44*d*, and a relief valve 21. The other side of the pair of input/output ports of the second hydraulic pump 13 is connected to a flow line communicating with a tank 25*c*. When the flow line pressure is equal to or larger than a predetermined pressure, the relief valve 21 allows the hydraulic working fluid to escape to the tank 25*c* to thereby protect the circuit. The selector valves 44*a*, 44*b*, 44*c*, and 44*d* switch between conduction and interruption of the flow line by a signal from the controller 57. When there is no signal from the controller 57, the selector valves 44*a*, 44*b*, 44*c*, and 44*d* are placed in the interruption state. Further, the controller 57 performs control such that the selector valves 44*a*, 44*b*, 44*c*, and 44*d* are not simultaneously placed in the conduction state.

The selector valve 44*a* is connected to the boom cylinder 1 via the flow line 212. The selector valve 44*b* is connected to the arm cylinder 3 via the flow line 214. The selector valve 44*c* is connected to the bucket cylinder 5 via the flow line 216. The selector valve 44*d* is connected to proportional selector valves 54 and 55 via a flow line 220.

Connected to one side of the pair of input/output ports of the fourth hydraulic pump 15 is a flow line 205, and connected to the flow line 205 are selector valves 46*a*, 46*b*, 46*c*, and 46*d*, and a relief valve 22. The other side of the pair of input/output ports of the fourth hydraulic pump 15 is connected to a flow line communicating with a tank 25*d*. When the flow line pressure is equal to or larger than a predetermined pressure, the relief valve 22 allows the hydraulic working fluid to escape to the tank 25*d* to thereby protect the circuit. The selector valves 46*a*, 46*b*, 46*c*, and 46*d* switch between conduction and interruption of the flow line by a signal from the controller 57. When there is no signal from the controller 57, the selector valves 46*a*, 46*b*, 46*c*, and 46*d* are placed in the interruption state. Further, the controller 57 performs control such that the selector valves 46*a*, 46*b*, 46*c*, and 46*d* are not simultaneously placed in the conduction state.

The selector valve 46*a* is connected to the boom cylinder 1 via the flow line 212. The selector valve 46*b* is connected to the arm cylinder 3 via the flow line 214. The selector valve 46*c* is connected to the bucket cylinder 5 via the flow line 216. The selector valve 46*d* is connected to the proportional selector valves 54 and 55 via the flow line 220.

Connected to one side of the pair of input/output ports of the sixth hydraulic pump 17 is a flow line 208, and connected to the flow line 208 are selector valves 48*a*, 48*b*, 48*c*, and 48*d*, and a relief valve 23. The other side of the pair of input/output ports of the sixth hydraulic pump 17 is connected to a flow line communicating with a tank 25*e*. When the flow line pressure is equal to or larger than a predetermined pressure, the relief valve 23 allows the hydraulic working fluid to escape to the tank 25e to thereby protect the circuit. The selector valves 48a, 48b, 48c, and 48d switch between conduction and interruption of the flow line by a signal from the controller 57. When there is no signal from the controller 57, the selector valves 48a, 48b, 48c, and 48d are placed in the interruption state. Further, the controller 57 performs control such that the selector valves 48a, 48b, 48c, and 48d are not simultaneously placed in the conduction state.

The selector valve 48a is connected to the boom cylinder 1 via the flow line 212. The selector valve 48b is connected to the arm cylinder 3 via the flow line 214. The selector valve 48c is connected to the bucket cylinder 5 via the flow line 216. The selector valve 48d is connected to the proportional selector valves 54 and 55 via the flow line 220.

Connected to one side of the pair of input/output ports of the eighth hydraulic pump 19 is a flow line 211, and connected to the flow line 211 are selector valves 50a, 50b, 50c, and 50d, and a relief valve 24. The other side of the pair of input/output ports of the eighth hydraulic pump 19 is connected to a flow line communicating with a tank 25f. When the flow line pressure is equal to or larger than a predetermined pressure, the relief valve 24 allows the hydraulic working fluid to escape to the tank 25f to thereby protect the circuit. The selector valves 50a, 50b, 50c, and 50d switch between conduction and interruption of the flow line by a signal from the controller 57. When there is no signal from the controller 57, the selector valves 50a, 50b, 50c, and 50d are placed in the interruption state. Further, the controller 57 performs control such that the selector valves 50a, 50b, 50c, and 50d are not simultaneously placed in the conduction state.

The selector valve 50a is connected to the boom cylinder 1 via the flow line 212. The selector valve 50b is connected to the arm cylinder 3 via the flow line 214. The selector valve 50c is connected to the bucket cylinder 5 via the flow line 216. The selector valve 50d is connected to the proportional selector valves 54 and 55 via the flow line 220.

The delivery port of the charge pump 11 is connected to the charging relief valve 20, and charging check valves 26, 27, 28, 29, 40a, 40b, 41a, 41b, 42a, and 42b via the flow line 229. The suction port of the charge pump 11 is connected to a flow line communicating with a tank 25b. The charging relief valve 20 adjusts the charge pressure of the charging check valves 26, 27, 28, 29, 40a, 40b, 41a, 41b, 42a, and 42b.

When the pressure of the flow lines 200 and 201 is below the pressure set by the charging relief valve 20, the charging check valve 26 supplies the flow lines 200 and 201 with the hydraulic fluid of the charge pump 11. When the pressure of the flow lines 203 and 204 is below the pressure set by the charging relief valve 20, the charging check valve 27 supplies the flow lines 203 and 204 with the hydraulic fluid of the charge pump 11. When the pressure of the flow lines 206 and 207 is below the pressure set by the charging relief valve 20, the charging check valve 28 supplies the flow lines 206 and 207 with the hydraulic fluid of the charge pump 11. When the pressure of the flow lines 209 and 210 is below the pressure set by the charging relief valve 20, the charging check valve 29 supplies the flow lines 209 and 210 with the hydraulic fluid of the charge pump 11.

When the pressure of the flow lines 212 and 213 is below the pressure set by the charging relief valve 20, the charging check valves 40a and 40b supply the flow lines 212 and 213 with the hydraulic fluid of the charge pump 11. When the pressure of the flow lines 214 and 215 is below the pressure set by the charging relief valve 20, the charging check valves 41a and 41b supply the flow lines 214 and 215 with the hydraulic fluid of the charge pump 11. When the pressure of the flow lines 216 and 217 is below the pressure set by the charging relief valve 20, the charging check valves 42a and 42b supply the flow lines 216 and 217 with the hydraulic fluid of the charge pump 11.

When the flow line pressure is equal to or larger than a predetermined pressure, relief valves 30a and 30b provided in the flow lines 200 and 201 allow the hydraulic working fluid to escape to the tank 25b via the charging relief valve 20 to thereby protect the circuit. When the flow line pressure is equal to or larger than a predetermined pressure, relief valves 31a and 31b provided in the flow lines 203 and 204 allow the hydraulic working fluid to escape to the tank 25b via the charging relief valve 20 to thereby protect the circuit.

When the flow line pressure is equal to or larger than a predetermined pressure, relief valves 32a and 32b provided in the flow lines 206 and 207 allow the hydraulic working fluid to escape to the tank 25b via the charging relief valve 20 to thereby protect the circuit. When the flow line pressure is equal to or larger than a predetermined pressure, relief valves 33a and 33b provided in the flow lines 209 and 210 allow the hydraulic working fluid to escape to the tank 25b via the charging relief valve 20 to thereby protect the circuit.

The flow line 212 is connected to the head side hydraulic fluid chamber 1a of the boom cylinder 1. The flow line 213 is connected to the rod side hydraulic fluid chamber 1b of the boom cylinder 1. The boom cylinder 1 is a hydraulic single rod cylinder configured to expand and contract by being supplied with the hydraulic working fluid. The expanding/contracting direction of the boom cylinder 1 depends upon the supply direction of the hydraulic working fluid.

When the flow line pressure is equal to or larger than a predetermined pressure, relief valves 37a and 37b provided in the flow lines 212 and 213 allow the hydraulic working fluid to escape to the tank 25b via the charging relief valve 20 to thereby protect the circuit. The flushing valve 34 provided in the flow lines 212 and 213 discharges any surplus hydraulic fluid in the flow lines to the tank 25b via the charging relief valve 20. A pressure sensor 64a connected to the flow line 212 measures the pressure of the flow line 212 and inputs it to the controller 57. A pressure sensor 64b connected to the flow line 213 measures the pressure of the flow line 213 and inputs it to the controller 57.

The flow line 214 is connected to the head side hydraulic fluid chamber 3a of the arm cylinder 3. The flow line 215 is connected to the rod side hydraulic fluid chamber 3b of the arm cylinder 3. The arm cylinder 3 is a hydraulic single rod cylinder configured to expand and contract by being supplied with the hydraulic working fluid. The expanding/contracting direction of the arm cylinder 3 depends upon the supply direction of the hydraulic working fluid.

When the flow line pressure is equal to or larger than a predetermined pressure, relief valves 38a and 38b provided in the flow lines 214 and 215 allow the hydraulic working fluid to escape to the tank 25b via the charging relief valve 20 to thereby protect the circuit. The flushing valve 35 provided in the flow lines 214 and 215 discharges any surplus hydraulic fluid in the flow lines to the tank 25b via the charging relief valve 20. A pressure sensor 65a connected to the flow line 214 measures the pressure of the flow line 214 and inputs it to the controller 57. A pressure sensor 65b connected to the flow line 215 measures the pressure of the flow line 215 and inputs it to the controller 57.

The flow line 216 is connected to the head side hydraulic fluid chamber 5a of the bucket cylinder 5. The flow line 217 is connected to the rod side hydraulic fluid chamber 5b of the bucket cylinder 5. The bucket cylinder 5 is a hydraulic single rod cylinder configured to expand and contract by being supplied with the hydraulic working fluid. The expanding/contracting direction of the bucket cylinder 5 depends upon the supply direction of the hydraulic working fluid.

When the flow line pressure is equal to or larger than a predetermined pressure, relief valves 39a and 39b provided in the flow lines 216 and 217 allow the hydraulic working fluid to escape to the tank 25b via the charging relief valve 20 to thereby protect the circuit. The flushing valve 36 provided in the flow lines 216 and 217 discharges any surplus hydraulic fluid in the flow lines to the tank 25b via the charging relief valve 20. A pressure sensor 66a connected to the flow line 216 measures the pressure of the flow line 216 and inputs it to the controller 57. A pressure sensor 66b connected to the flow line 217 measures the pressure of the flow line 217 and inputs it to the controller 57.

The flow line 218 and the flow line 219 are connected to the swing device 7. The swing device 7 is a hydraulic motor configured to rotate upon receiving the supply of the hydraulic working fluid. When the flow line differential pressure between the flow lines 218 and 219 is equal to or larger than a predetermined pressure, relief valves 51a and 51b provided in the flow line 218 and the flow line 219 allow the hydraulic working fluid to escape from the high pressure side flow line to the low pressure side flow line to protect the circuit. A pressure sensor 67a connected to the flow line 218 measures the pressure of the flow line 218 and inputs it to the controller 57. A pressure sensor 67b connected to the flow line 219 measures the pressure of the flow line 219 and inputs it to the controller 57.

A flow line 221 and a flow line 222 connect a proportional selector valve 54 and a track device 8a to each other. When the flow line differential pressure between the flow line 221 and the flow line 222 is equal to or larger than a predetermined pressure, relief valves 52a and 52b provided in the flow line 221 and the flow line 222 allow the hydraulic working fluid to escape from the high pressure flow line to the low pressure flow line to protect the circuit. The proportional selector valve 54 can switch the connection destination of the flow line 220 and the tank 25a to the flow line 221 or to the flow line 222 by a signal from the controller 57. Further, it can also adjust the flow rate. The track device 8a is a hydraulic motor configured to rotate upon receiving the supply of the hydraulic working fluid.

A flow line 223 and a flow line 224 connect a proportional selector valve 55 and a track device 8b to each other. When the flow line differential pressure between the flow line 223 and the flow line 224 is equal to or larger than a predetermined pressure, relief valves 53a and 53b provided in the flow line 223 and the flow line 224 allow the hydraulic working fluid to escape from the high pressure flow line to the low pressure flow line to protect the circuit. The proportional selector valve 55 can switch the connection destination of the flow line 220 and the tank 25a to the flow line 223 or to the flow line 224 by a signal from the controller 57. Further, it can also adjust the flow rate. The track device 8b is a hydraulic motor configured to rotate upon receiving the supply of the hydraulic working fluid.

An operation lever 56a imparts the command values of the expanding/contracting direction and speed of the boom cylinder 1 to the controller 57. An operation lever 56b imparts the command values of the expanding/contracting direction and speed of the arm cylinder 3 to the controller 57.

An operation lever 56c imparts the command values of the expanding/contracting direction and speed of the bucket cylinder 5 to the controller 57. An operation lever 56d imparts the command values of the rotational direction and rotational speed of the swing device 7 to the controller 57. Further, although not shown, there is also provided an operation lever which imparts the command values of the rotational direction and rotational speed of the track devices 8a and 8b to the controller 57.

Based upon the command values of the expanding/contracting direction and speed of the boom cylinder 1, the arm cylinder 3, and the bucket cylinder 5 from the operation levers 56a through 56d, the command values of the rotational direction and rotational speed of the swing device 7 and the track devices 8a and 8b, and sensor information in the hydraulic circuit, the controller 57 controls the regulator 12a of the first hydraulic pump 12 through the regulator 19a of the eighth hydraulic pump 19, the selector valves 43a through 43d, 44a through 44d, 45a through 45d, 46a through 46d, 47a through 47d, 48a through 48d, 49a through 49d, 50a through 50d, and the proportional selector valves 54 and 55.

Next, the setting of the flushing valves 34, 35, and 36 of the present embodiment will be described.

The pressure receiving area ratio between the rod side hydraulic fluid chamber 1b and the head side hydraulic fluid chamber 1a of the boom cylinder 1 shown in FIG. 5, the pressure receiving area ratio between the rod side hydraulic fluid chamber 3b and the head side hydraulic fluid chamber 3a of the arm cylinder 3, and the pressure receiving area ratio between the rod side hydraulic fluid chamber 5b and the head side hydraulic fluid chamber 5a of the bucket cylinder 5 are different from each other. In the present embodiment, flushing valves of the same specifications are employed, and a different spring set load Fpre is set for each flushing valve. Further, in the examples described below, the pressure receiving area of the first piston and the pressure receiving area of the second piston are the same in these flushing valves.

The spring set load Fpre1 of the flushing valve 34 provided in the closed circuit for the boom cylinder 1 is set to the value calculated by the following equation (19) with respect to the pressure receiving area Ar1 of the rod side hydraulic fluid chamber 1b and the pressure receiving area Ah1 of the head side hydraulic fluid chamber 1a of the boom cylinder 1.

$$Fpre1=(Ah1/Ar1-1)\times Pch \times Ap \quad (19)$$

Ap is the pressure receiving area of the first piston and the second piston constituting the flushing valve 34. Pch is the charge pressure set by the charging relief valve 20.

The spring set load Fpre2 of the flushing valve 35 provided in the closed circuit for the arm cylinder 3 is set to the value calculated by the following equation (20) with respect to the pressure receiving area Ar2 of the rod side hydraulic fluid chamber 3b and the pressure receiving area Ah2 of the head side hydraulic fluid chamber 3a of the arm cylinder 3.

$$Fpre2=(Ah2/Ar2-1)\times Pch \times Ap \quad (20)$$

Ap is the pressure receiving area of the first piston and the second piston constituting the flushing valve 35. Pch is the charge pressure set by the charging relief valve 20.

The spring set load Fpre3 of the flushing valve 36 provided in the closed circuit for the bucket cylinder 5 is set to the value calculated by the following equation (21) with respect to the pressure receiving area Ar3 of the rod side hydraulic fluid chamber 5b and the pressure receiving area Ah3 of the head side hydraulic fluid chamber 5a of the bucket cylinder 5.

$$Fpre3=(Ah3/Ar3-1) \times Pch \times Ap \qquad (21)$$

Ap is the pressure receiving area of the first piston and the second piston constituting the flushing valve 36. Pch is the charge pressure set by the charging relief valve 20.

As described above, it is possible to set the pre-load of the flushing valve by adjusting the set load of the spring, so that even in a case where the pressure receiving area ratio between the rod side hydraulic fluid chamber and the head side hydraulic fluid chamber differs for each single rod cylinder mounted in the work machine, it is possible to use flushing valves of the same specifications. As a result, it is possible to effect component sharing.

In the second embodiment of the work machine according to the present invention described above, it is possible to achieve the same effects as those of the first embodiment described above.

Further, in the second embodiment of the work machine according to the present invention, even in a case where the pressure receiving area ratio between the rod side hydraulic fluid chamber and the head side hydraulic fluid chamber differs for each single rod cylinder mounted in the work machine, it is possible to use flushing valves of the same specifications. As a result, it is possible to effect component sharing, and to achieve an improvement in terms of productivity.

The present invention is not restricted to the above-described embodiments but includes various modifications without departing from the scope of the gist of the invention. For example, while in the above-described embodiments the present invention is applied to the hydraulic excavator, this should not be construed restrictively. The present invention is applicable to any other work machine such as a hydraulic crane or a wheel loader so long as it is a work machine equipped with a hydraulic actuator.

DESCRIPTION OF REFERENCE CHARACTERS

1: Boom cylinder (hydraulic cylinder)
1a: Head side hydraulic fluid chamber
1b: Rod side hydraulic fluid chamber
3: Arm cylinder (hydraulic cylinder)
5: Bucket cylinder (hydraulic cylinder)
9: Engine
10: Power transmission device
11: Charge pump (another hydraulic pump)
12: First hydraulic pump (one hydraulic pump)
12a: Regulator (flow rate regulation means)
13: Second hydraulic pump
13a: Regulator
20: Charging relief valve
25: Hydraulic working fluid tank
26: Check valve
34: Flushing valve
34a: Valve main body
34b: Spool
34c1: First piston
34c2: Second piston
34d1: First spring
34d2: Second spring
34g1: First port
34g2: Second port
34h1: First hydraulic fluid chamber (first liquid chamber)
34h2: Second hydraulic fluid chamber (second liquid chamber)
34i: Third port
40a: Check valve
40b: Check valve
212: Flow line (first flow line)
213: Flow line (second flow line)
229: Flow line (third flow line)

The invention claimed is:
1. A work machine comprising:
one hydraulic pump having a regulator that controls a flow rate and direction of a hydraulic working fluid delivered;
a single rod hydraulic cylinder driven by the hydraulic working fluid and configured to drive a work device;
a hydraulic closed circuit that connects in a closed-circuit fashion, with the one hydraulic pump and the single rod hydraulic cylinder being connected by a flow line through which the hydraulic working fluid flows;
another hydraulic pump that delivers a hydraulic working fluid;
a relief valve connected to a delivery flow line of the other hydraulic pump;
a first flow line connected to a head side hydraulic fluid chamber of the single rod hydraulic cylinder of the hydraulic closed circuit;
a first check valve connected so as to be capable of supplying the hydraulic working fluid to the first flow line from the delivery flow line of the other hydraulic pump;
a second flow line connected to a rod side hydraulic fluid chamber of the single rod hydraulic cylinder of the hydraulic closed circuit;
a second check valve connected so as to be capable of supplying the hydraulic working fluid to the second flow line from the delivery flow line of the other hydraulic pump;
a third flow line connected to a tank via the relief valve; and
a flushing valve, wherein the flushing valve has:
a valve main body connected to the first flow line, the second flow line, and the third flow line;
a spool that can select, in accordance with a position where the spool is arranged in the valve main body, a connection between the first flow line and the third flow line, a connection between the second flow line and the third flow line, or an interruption of the connection between the first flow line, the second flow line, and the third flow line;
a first recess section formed on a first end surface of the spool in an axial direction of the spool;
a first piston slidably fit-engaged with the first recess section;
a first liquid chamber that is formed between the first piston and the first recess section inside the valve main body and into which the hydraulic working fluid from the first flow line flows;
a second recess section formed on a second end surface of the spool in an axial direction of the spool;
a second piston slidably fit-engaged with the second recess section; and
a second liquid chamber that is formed between the second piston and the second recess section inside the valve main body and into which the hydraulic working fluid from the second flow line flows, wherein the first piston pressurizes the hydraulic working fluid having flowed into the first liquid chamber and moves the spool to a position where the second flow line and the third flow line are communicated together by hydraulic pressure of the first liquid chamber, and the second piston pressurizes the hydraulic working fluid having flowed into the second liquid chamber and moves the spool to a position where the first flow line and the third flow line are communicated together, by a hydraulic pressure of the second liquid chamber.

2. The work machine according to claim 1, wherein an area of a pressure receiving section of the first piston is larger than an area of a pressure receiving section of the second piston.

3. The work machine according to claim 2, wherein a ratio between the area of the pressure receiving section of the first piston and the area of the pressure receiving section of the second piston is configured to be equal to a ratio between an area of a pressure receiving section of the head side hydraulic fluid chamber and an area of a pressure receiving section of the rod side hydraulic fluid chamber of the single rod hydraulic cylinder.

4. The work machine according to claim 3, wherein the flushing valve further has a spring generating a force maintaining the spool at a position where the first flow line, the second flow line, and the third flow line are interrupted from each other; and a set load of the spring is equal to or larger than a value calculated by subtracting a second load generated in the second piston when a relief set pressure of the relief valve acts on the second liquid chamber from a first load generated in the first piston when a relief set pressure of the relief valve acts on the first liquid chamber.

5. The work machine according to claim 1, wherein areas of pressure receiving sections of the first piston and the second piston are the same;

the flushing valve further has a spring generating a force maintaining the spool at a position where the first flow line, the second flow line, and the third flow line are interrupted from each other; and a set load of the spring is equal to or larger than a value calculated by multiplying a value obtained by subtracting 1 from a value obtained by dividing a pressure receiving area of a head side hydraulic fluid chamber of the single rod hydraulic cylinder by a pressure receiving area of a rod side hydraulic fluid chamber the single rod hydraulic cylinder by a load generated in the first piston when a relief set pressure of the relief valve acts on the first liquid chamber.

* * * * *